(12) United States Patent
Rousso et al.

(10) Patent No.: US 7,838,838 B2
(45) Date of Patent: Nov. 23, 2010

(54) IMAGING TECHNIQUES FOR REDUCING BLIND SPOTS

(75) Inventors: Benny Rousso, Rishon-LeZion (IL); Shlomo Ben-Haim, London (GB); Haim Melman, Kfar-Saba (IL); Michael Nagler, Tel-Aviv (IL); Yoel Zilberstien, Herzeliya (IL); Sajed Haj-Yahya, Taybe (IL)

(73) Assignee: Spectrum Dynamics LLC, Orangeburg, NY (US)

( * ) Notice: Subject to any disclaimer, the term of this patent is extended or adjusted under 35 U.S.C. 154(b) by 0 days.

(21) Appl. No.: 12/561,751

(22) Filed: Sep. 17, 2009

(65) Prior Publication Data

US 2010/0001200 A1  Jan. 7, 2010

Related U.S. Application Data

(63) Continuation of application No. 11/769,826, filed on Jun. 28, 2007, now Pat. No. 7,601,966.

(60) Provisional application No. 60/816,970, filed on Jun. 28, 2006.

(51) Int. Cl.
*G01T 1/00* (2006.01)
(52) U.S. Cl. .................................. 250/394
(58) Field of Classification Search ............... 250/394, 250/370.01–370.15; 378/98.8
See application file for complete search history.

(56) References Cited

U.S. PATENT DOCUMENTS

| 4,731,536 A |  | 3/1988 | Rische et al. |  |
| 5,349,190 A | * | 9/1994 | Hines et al. | 250/363.05 |

(Continued)

FOREIGN PATENT DOCUMENTS

EP  0887661  12/1998

(Continued)

OTHER PUBLICATIONS

Appeal Brief Dated Jan. 19, 2010 to Notice of Appeal of Nov. 16, 2009 From the US Patent and Trademark Office Re.: U.S. Appl. No. 10/616,301.

(Continued)

*Primary Examiner*—David P Porta
*Assistant Examiner*—Kiho Kim
(74) *Attorney, Agent, or Firm*—William H. Dippert; Eckert Seamans Cherin & Mellott, LLC

(57) ABSTRACT

An imaging system is provided for radioimaging a region of interest (ROI) of a subject. The system includes a housing, a support structure, which is movably coupled to the housing, and at least one motor assembly, coupled to the housing and the support structure, and configured to move the support structure with respect to the housing. The system also includes at least two detector assemblies, fixed to the support structure, and comprising respective radiation detectors and angular orientators. A control unit drives the motor assembly to position the support structure in a plurality of positions with respect to the housing, and, while the support structure is positioned in each of the plurality of positions, drives the orientators to orient the respective detectors in a plurality of rotational orientations with respect to the ROI, and to detect radiation from the ROI at the rotational orientations. Other embodiments are also described.

46 Claims, 6 Drawing Sheets

U.S. PATENT DOCUMENTS

| | | | |
|---|---|---|---|
| 5,386,446 | A | 1/1995 | Fujimoto et al. |
| 5,695,500 | A | 12/1997 | Taylor et al. |
| 5,784,432 | A | 7/1998 | Kurtz et al. |
| 6,147,353 | A | 11/2000 | Gagnon et al. |
| 6,239,438 | B1 | 5/2001 | Schubert |
| 6,242,743 | B1 * | 6/2001 | DeVito et al. .......... 250/363.05 |
| 6,438,401 | B1 | 8/2002 | Cheng et al. |
| 6,459,925 | B1 | 10/2002 | Nields et al. |
| 6,480,732 | B1 | 11/2002 | Tanaka et al. |
| 6,484,051 | B1 | 11/2002 | Daniel |
| 6,490,476 | B1 | 12/2002 | Townsend et al. |
| 6,728,583 | B2 | 4/2004 | Hallett |
| 6,771,802 | B1 | 8/2004 | Patt et al. |
| 7,142,634 | B2 | 11/2006 | Engler et al. |
| 2002/0148970 | A1 | 10/2002 | Wong et al. |
| 2004/0081623 | A1 | 4/2004 | Eriksen et al. |
| 2005/0215889 | A1 | 9/2005 | Patterson, II |
| 2005/0253073 | A1 | 11/2005 | Joram et al. |
| 2005/0266074 | A1 | 12/2005 | Zilberstein et al. |
| 2007/0156047 | A1 | 7/2007 | Nagler et al. |
| 2008/0042067 | A1 | 2/2008 | Rousso et al. |
| 2008/0128626 | A1 | 6/2008 | Rousso et al. |
| 2008/0237482 | A1 | 10/2008 | Shahar et al. |
| 2008/0260637 | A1 | 10/2008 | Dickman |
| 2008/0277591 | A1 | 11/2008 | Shahar et al. |
| 2009/0078875 | A1 | 3/2009 | Rousso et al. |
| 2009/0152471 | A1 | 6/2009 | Rousso et al. |
| 2009/0190807 | A1 | 7/2009 | Rousso et al. |

FOREIGN PATENT DOCUMENTS

| | | |
|---|---|---|
| WO | WO 00/10034 | 2/2000 |

OTHER PUBLICATIONS

Communication Pursuant to Article 93(3) EPC Dated Mar. 8, 2010 From the European Patent Office Re.: Application No. 06832278.3.
Communication Pursuant to Article 94(3) EPC Dated Mar. 8, 2010 From the European Patent Office Re.: Application No. 06832278.3.
Communication Pursuant to Article 94(3) EPC Dated Apr. 16, 2010 From the European Patent Office Re. Application No. 01951883.6.
Communication Pursuant to Article 94(3) EPC Dated Oct. 21, 2009 From the European Patent Office Re.: Application No. 02716285.8.
Communication Pursuant to Article 94(3) EPC Dated Jul. 22, 2009 From the European Patent Office Re.: Application No. 06809851.6.
Notice of Allowance Dated Jul. 16, 2009 From the US Patent and Trademark Office Re.: U.S. Appl. No. 12/084,559.
Notice of Allowance Dated Sep. 17, 2009 From the US Patent and Trademark Office Re.: U.S. Appl. No. 10/553,568. Suppol. IDS VIII in 25855.
Notice of Allowance Dated Nov. 23, 2009 From the US Patent and Trademark Office Re.: U.S. Appl. No. 12/084,559.
Notice of Appeal and Pre-Appeal Brief Dated Jan. 4, 2010 to Official Action of Sep. 2, 2009 From the US Patent and Trademark Office Re.: U.S. Appl. No. 10/343,792.
Notice of Appeal Dated Nov. 16, 2009 to Official Action of Jul. 15, 2009 From the US Patent and Trademark Office Re.: U.S. Appl. No. 10/616,301.
Official Action Dated Mar. 1, 2010 From the US Patent and Trademark Office Re.: U.S. Appl. No. 11/794,799.
Official Action Dated Sep. 1, 2009 From the US Patent and Trademark Office Re.: U.S. Appl. No. 11/794,799.
Official Action Dated Mar. 2, 2010 From the US Patent and Trademark Office Re.: U.S. Appl. No. 10/836,223.
Official Action Dated Mar. 2, 2010 From the US Patent and Trademark office Re.: U.S. Appl. No. 11/980,617.
Offical Action Dated Sep. 2, 2009 From the US Patent and Trademark Office Re.: U.S. Application No. 10/343,792.
Official Action Dated Jul. 7, 2009 From the US Patent and Trademark Office Re.: U.S. Appl. No. 10/533,568.
Official Action Dated Apr. 8, 2010 From the US Patent and Trademark Office Re.: U.S. Appl. No. 11/980,690.
Official Action Dated Dec. 8, 2009 From the US Patent and Trademark Office Re.: U.S. Appl. No. 11/132,320.
Official Action Dated Jan. 8, 2010 From the US Patent and Trademark Office Re.: U.S. Appl. No. 11/656,548.
Official Action Dated Apr. 9, 2010 From the US Patent and Trademark Office Re.: U.S. Appl. No. 11/798,017.
Official Action Dated Aug. 11, 2009 From the US Patent and Trademark Office Re.: U.S. Appl. No. 09/641,973.
Official Action Dated Mar. 11, 2010 From the US Patent and Trademark Office Re.: U.S. Appl. No. 11/607,075.
Official Action Dated Jul. 15, 2009 From the US Patent and Trademark Office Re.: U.S. Appl. No. 10/616,301.
Official Action Dated Sep. 15, 2009 From the US Patent and Trademark Office Re.: U.S. Appl. No. 10/616,307.
Official Action Dated Sep. 15, 2009 From the US Patent and Trademark Office Re.: U.S. Appl. No. 10/836,223.
Official Action Dated Sep. 16, 2009 From the US Patent and Trademark Office Re.: U.S. Appl. No. 09/727,464.
Official Action Dated Mar. 19, 2010 From the US Patent and Trademark Office Re.: U.S. Appl. No. 10/240,239.
Official Action Dated Jul. 20, 2009 From the US Patent and Trademark Office Re.: U.S. Appl. No. 11/980,617.
Official Action Dated Sep. 21, 2009 From the US Patent and Trademark Office Re.: U.S. Appl. No. 11/798,017.
Official Action Dated Feb. 23, 2010 From the US Patent and Trademark Office Re.: U.S. Appl. No. 09/641,973.
Official Action Dated Apr. 28, 2010 From the US Patent and Trademark Office Re.: U.S. Appl. No. 10/616,301.
Official Action Dated Aug. 28, 2009 From the US Patent and Trademark Office Re.: U.S. Appl. No. 10/240,239.
Official Action Dated Oct. 30, 2009 From the US Patent and Trademark Office Re.: U.S. Appl. No. 11/980,690.
Response Dated Jul. 1, 2010 to Official Action of Mar. 2, 2010 From the US Patent and Trademark Office Re.: U.S. Appl. No. 11/980,617.
Response Dated Jun. 3, 2010 to Notice of Appeal and Pre-Appeal Brief of Jan. 4, 2010 to Official Action of Sep. 2, 2009 From the US Patent and Trademark Office Re.: U.S. Appl. No. 10/343,792.
Response Dated Dec. 10, 2009 to Official Action of Aug. 11, 2009 From the US Patent and Trademark Office Re.: U.S. Appl. No. 09/641,973.
Response Dated May 10, 2010 to Official Action of Apr. 8, 2010 From the US Patent and Trademark Office Re.: U.S. Appl. No. 11/980,690.
Response Dated May 10, 2010 to Official Action of Jan. 8, 2010 From the US Patent and Trademark Office Re.: U.S. Appl. No. 11/656,548.
Response Dated May 11, 2010 to Official Action of Mar. 11, 2010 From the US Patent and Trademark Office Re.: U.S. Appl. No. 11/607,075.
Response Dated Oct. 12, 2009 to Notice of Allowance of Jul. 16, 2009 From the US Patent and Trademark Office Re.: U.S. Appl. No. 12/084,559.
Response Dated Jan. 14, 2010 to Official Action of Sep. 15, 2009 From the US Patent and Trademark Office Re.: U.S. Appl. No. 10/616,307.
Response Dated Jan. 14, 2010 to Official Action of Sep. 15, 2009 From the US Patent and Trademark Office Re.: U.S. Appl. No. 10/836,223.
Response Dated Oct. 14, 2009 to Official Action of May 14, 2009 From the US Patent and Trademark Office Re.: U.S. Appl. No. 11/656,548.
Response Dated Jan. 21, 2010 to Official Action of Sep. 21, 2009 From the US Patent and Trademark Office Re.: U.S. Appl. No. 11/798,017.
Response Dated Feb. 22, 2010 to Communication Pursuant to Article 94(3) EPC of Oct. 21, 2009 From the European Patent Office Re.: U.S. Appl. No. 02716285.8.
Response Dated May 26, 2010 to Official Action of Mar. 19, 2010 From the US Patent and Trademark Office Re.: U.S. Appl. No. 10/240,239.
Response Dated Dec. 28, 2009 to Official Action of Aug. 28, 2009 From the US Patent and Trademark Office Re.: U.S. Appl. No. 10/240,239.

Response Dated Dec. 30, 2009 to Official Action of Sep. 1, 2009 From the US Patent and Trademark Office Re.: U.S. Appl. No. 11/794,799.

Response Dated Dec. 30, 2009 to Official Action of Oct. 30, 2009 From the US Patent and Trademark Office Re.: U.S. Appl. No. 11/980,690.

Second International Search Report Dated Jun. 1, 2009 From the International Searching Authority Re.: Application No. PCT/IL07/00918.

Supplementary Partial European Search Report and the European Search Opinion Dated Dec. 15, 2009 From the European Patent Office Re.: Application No. 06832278.3.

Supplementary Partial European Search Report and the European Search Opinion Dated Oct. 16, 2009 From the European Patent Office Re.: Application No. 06756259.5.

Gilland et al. "A 3D Model of Non-Uniform Attenuation and Detector Response for Efficient Iterative Reconstruction in SPECT", Physics in Medicine and Biology, XP002558623, 39(3): 547-561, Mar. 1994. pp. 549-550, Section 2.3 'Active Voxel Reconstruction', p. 551, Lines 4-8.

Gilland et al. "Simultaneous Reconstruction and Motion Estimation for Gated Cardiac ECT", IEEE Transactions on Nuclear Science, XP011077797, 49(5): 2344-2349, Oct. 1, 2002. p. 2344, Section 'Introduction', First §.

Kadrmas et al. "Static Versus Dynamic Teboroxime Myocardial Perfusion SPECT in Canines", IEEE Transactions on Nuclear Science, 47(3): 1112-1117, Jun. 2000.

Li et al. "A HOTLink/Networked PC Data Acquisition and Image Reconstruction System for a High Resolution Whole-Body PET With Respiratory or ECG-Gated Performance", IEEE Nuclear Sience Symposium and Medical Imaging Conference, Norfolk, VA, USA, Nov. 10-16, 2002, XP010663724, 2: 1135-1139, Nov. 10, 2002. p. 1137, First Col., 2nd §.

Moore et al. "Quantitative Multi-Detector Emission Computerized Tomography Using Iterative Attenuation Compensation", Journal of Nuclear Medicine, XP002549083, 23(8): 706-714, Aug. 1982. Abstract, p. 707, Section 'The Multi-Detector Scanner', First §.

Ogawa et al. "Ultra High Resoultion Pinhole SPECT", IEEE Nuclear Science Symposium, 2: 1600-1604, 1998.

Pellegrini et al. "Design of Compact Pinhole SPECT System Based on Flat Panel PMT", IEEE Nuclear Science Symposium Conference Record, 3: 1828-1832, 2003.

Qi et al. "Resolution and Noise Properties of MAP Reconstruction for Fully 3-D PET", IEEE Transactions on Medical Imaging, XP002549082, 19(5): 493-506, May 2000. p. 493, Col.2, Lines 10-21, p. 495, Col.1, Last §.

Wilson et al. "Non-Stationary Noise Characteristics for SPECT Images", Proceedings of the Nuclear Science Symposium and Medical Imaging Conference, Santa Fe, CA, USA, Nov. 2-9, 1991, XP010058168, p. 1736-1740, Nov. 2, 1991. p. 1736, Col.2, Lines 4-6.

Wu et al. "ECG-Gated Pinhole SPECT in Mice With Millimeter Spatial Resolution", IEEE Transactions on Nuclear Science, 47(3): 1218-1221, Jun. 2000.

* cited by examiner

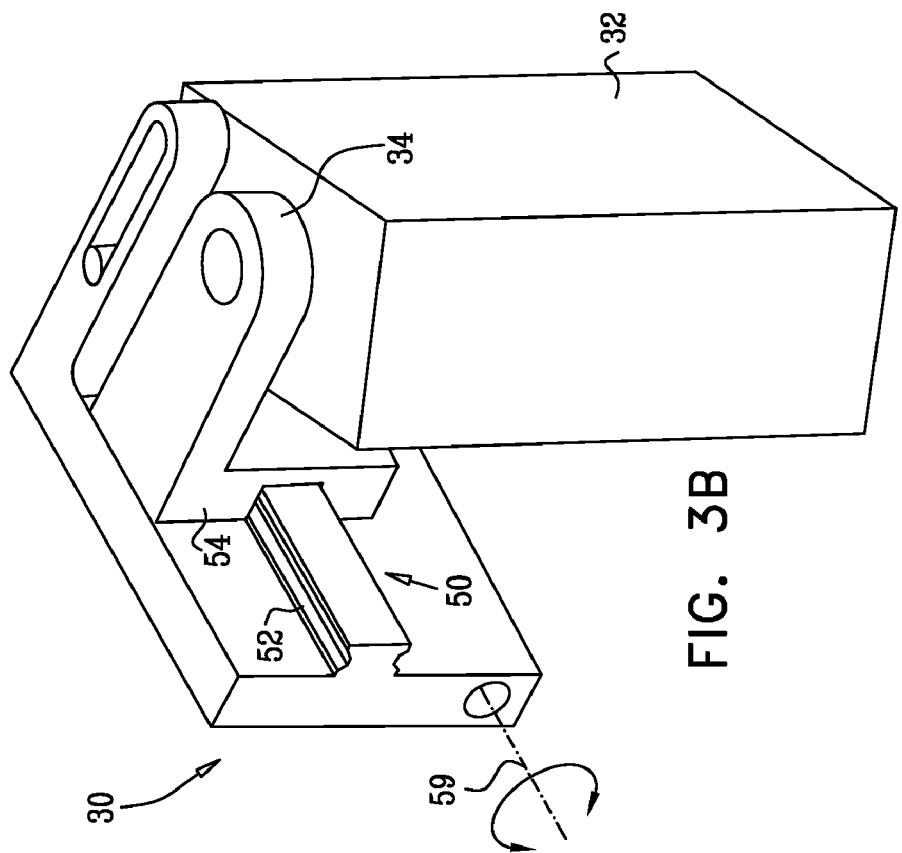
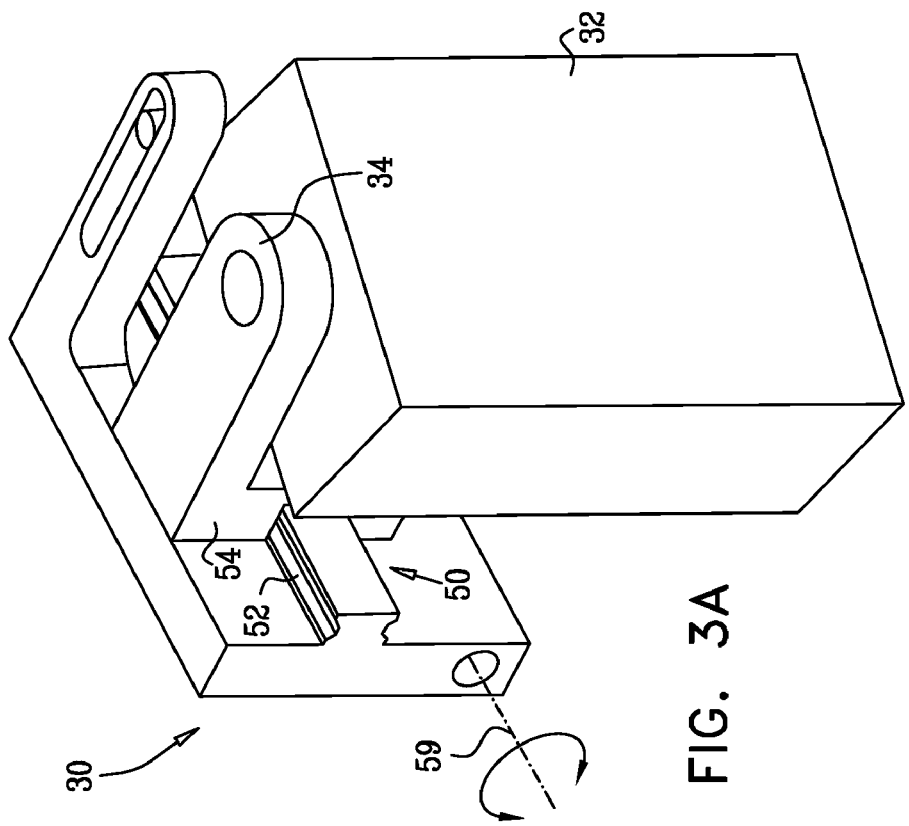

IMAGING TECHNIQUES FOR REDUCING BLIND SPOTS

CROSS-REFERENCES TO RELATED APPLICATIONS

The present application is a continuation of U.S. patent application Ser. No. 11/769,826, filed Jun. 28, 2007, which claims the benefit of priority of U.S. Provisional Patent Application No. 60/816,970, filed Jun. 28, 2006, both of which are assigned to the assignee of the present application, and are incorporated herein by reference in their entirety.

FIELD OF THE INVENTION

The present invention relates generally to radiological imaging techniques, and specifically to apparatus and methods for positioning detectors of radiological imaging systems.

BACKGROUND OF THE INVENTION

PCT Publication WO 06/051531 to Rousso et al., which is assigned to the assignee of the present application and is incorporated herein by reference, describes radioimaging methods, devices and radiopharmaceuticals.

U.S. Pat. No. 6,242,743 to DeVito et al., which is incorporated herein by reference, describes a tomographic imaging system which images ionizing radiation such as gamma rays or x rays. The system is described as being capable of producing tomographic images without requiring an orbiting motion of the detector(s) or collimator(s) around the object of interest, and of observing the object of interest from sufficiently many directions to allow multiple time-sequenced tomographic images to be produced. The system consists of a plurality of detector modules which are distributed about or around the object of interest and which fully or partially encircle it. The detector modules are positioned close to the object of interest thereby improving spatial resolution and image quality. The plurality of detectors view a portion of the patient or object of interest simultaneously from a plurality of positions. These attributes are achieved by configuring small modular radiation detector with high-resolution collimators in a combination of application-specific acquisition geometries and non-orbital detector module motion sequences composed of tilting, swiveling and translating motions, and combinations of such motions. Various kinds of module geometry and module or collimator motion sequences are possible. The geometric configurations may be fixed or variable during the acquisition or between acquisition intervals.

The following patents and patent application publications, which describe gamma cameras and imaging processing techniques, and which are incorporated herein by reference, may be of interest:

U.S. Patent Application Publication 2005/0205792 to Rousso et al.

PCT Publication WO 05/118659 to Dichterman et al.

PCT Publication WO 05/119025 to Nagler et al.

U.S. Patent Application Publication 2004/0204646 to Nagler et al.

PCT Publication WO 06/054296 to Dickman

PCT Publication WO 04/042546 to Kimchy et al.

U.S. Patent Application Publication 2004/0054248 to Kimchy et al.

U.S. Patent Application Publication 2004/0015075 to Kimchy et al.

U.S. Patent Application Publication 2004/0054278 to Kimchy et al.

U.S. Patent Application Publication 2005/0266074 to Zilberstein et al.

U.S. Pat. Nos. 5,939,724, 5,587,585, and 5,365,069 to Eisen et al.

U.S. Pat. No. 6,943,355 to Shwartz et al.

U.S. Pat. No. 5,757,006 to DeVito et al.

U.S. Pat. No. 6,137,109 to Hayes

U.S. Pat. No. 6,388,258 to Berlad et al.

U.S. Pat. No. 6,429,431 to Wilk

U.S. Pat. No. 6,838,672 to Wagenaar et al.

U.S. Pat. Nos. 6,740,882, 6,545,280, 6,229,145, 5,519,221, 5,252,830, and 6,628,984 to Weinberg U.S. Pat. No. 6,713,766 to Garrard et al.

U.S. Pat. No. 6,765,981 to Heumann

U.S. Pat. No. 6,664,542 to Ye et al.

U.S. Pat. No. 6,080,984 to Friesenhahn

U.S. Pat. No. 5,818,050 to Dilmanian et al.

U.S. Pat. No. 6,728,583 to Hallett

U.S. Pat. No. 5,481,115 to Hsieh et al.

U.S. Pat. No. 6,723,988 to Wainer

U.S. Pat. No. 6,940,070 to Turner

U.S. Pat. No. 6,635,879 to Jimbo et al.

U.S. Pat. No. 6,353,227 to Boxen

U.S. Pat. No. 6,184,530 to Hines et al.

U.S. Patent Application Publication 2005/0145797 to Oaknin et al.

U.S. Patent Application Publication 2004/0251419 to Nelson et al.

U.S. Patent Application Publication 2003/0001098 to Stoddart et al.

PCT Publication WO 98/16852 to DeVito et al.

PCT Publication WO 05/059840 to Nielsen et al.

U.S. Pat. No. 5,813,985 to Carroll

SUMMARY OF THE INVENTION

In embodiments of the present invention, an imaging system comprises a plurality of detector assemblies, each of which comprises a detector coupled to an angular orientator. Each of the detectors comprises a plurality of gamma ray sensors and at least one collimator. A control unit drives, typically separately, each of the orientators to orient its respective detector in a plurality of rotational orientations with respect to a region of interest (ROI) of a subject. The control unit produces an image, typically a SPECT image, from a plurality of radiation acquisitions acquired with the detectors in different relative orientations.

In typical implementations of the imaging system, the detector assemblies are laterally spaced apart from one another because of physical constraints, such as the width and depth of the detectors. Such spacing causes reduced detection of photons emitted from certain areas of the ROI, particularly areas near the surface of the subject's body, which are near the detectors.

In some embodiments of the present invention, each of the detectors is coupled to a respective translator. During an image acquisition procedure, the control unit drives each of the translators to position its respective detector in a plurality of lateral positions, such as two lateral positions. While each detector is in each of its respective lateral positions, the control unit drives the respective orientator to orient the detector in a plurality of rotational orientations with respect to the ROI. The combination of such lateral translatory motion and rotational motion increases the number of angles from which photons emitted from the ROI are detected, particularly in areas of the ROI near the surface of the subject's body.

For some applications, during a first portion of an imaging procedure, each of the detectors is positioned in a first lateral position, and during a second portion of the imaging procedure, the detector is positioned in a second lateral position. The distance between the first and second positions is typically about 50% of the distance between the rotational axis of the detector and that of a neighboring detector, such as between about 40% and about 60% of the distance. The positioning of the detectors in both positions increases the number of angles from which photons emitted from the ROI are detected, thereby improving photon detection counts for areas of the ROI near the surface of the subject's body.

In some embodiments of the present invention, the camera comprises a support structure, to which the detector assemblies are coupled. The camera comprises a housing, which is shaped so as to define a cavity, in which the support structure is positioned. The housing generally is configured to remain stationary throughout an imaging procedure. In order to position each of the detector assemblies in a plurality of lateral positions, the control unit drives one or more motors to move the support structure within the cavity. The camera comprises at least one variable-length motor assembly (typically exactly one variable-length motor assembly), which is configured to move the support structure with respect to the housing by changing a length of the assembly. The motor assembly typically further comprises a first pivoting post, which is coupled to the support structure, and a second pivoting post, which is coupled to the housing. The use of this single-support frame configuration enables the use of a single motor assembly for simultaneously positioning all of the detector assemblies at precise locations with respect to each other and a coordinate system of the camera.

In some embodiments of the present invention, the imaging system comprises at least one detector assembly, which comprises first and second axial supports, which are coupled to respective angular orientators. The assembly further comprises at least one first detector coupled to the first axial support, and at least one second detector coupled to the second axial support. The first and second detectors are arranged along the axial supports such that the first detector is completely longitudinally offset from the second detector. For some applications, the assembly further comprises a third detector, coupled to the first axial support, and a fourth detector, coupled to the second axial support, and the detectors are arranged in a checkerboard pattern.

As a result of this offset arrangement, the detectors are able to be positioned laterally closer to one another than is possible using arrangements having a single elongated detector per angular orientator. However, the assembly has detection gaps in the longitudinal regions of each axial support to which no detector is coupled. To compensate for these gaps, the camera is configured to position the detector assembly in a first longitudinal position with respect to an ROI during a first portion of an image acquisition procedure, and in a second longitudinal position with respect to the ROI during a second portion of the procedure. A longitudinal distance between the first and second longitudinal positions typically equals approximately a longitudinal length of one of the detectors. While the assembly is in each of the longitudinal positions, the control unit drives the orientators to orient their respective detectors in a plurality of rotational orientations with respect to the ROI. As a result, the entire ROI opposite the assembly is covered by the assembly in one of its two longitudinal positions with respect to the ROI.

There is therefore provided, in accordance with an embodiment of the present invention, an imaging system for radioimaging a region of interest (ROI) of a subject, the system including:

a housing;

a support structure, movably coupled to the housing;

at least one motor assembly, coupled to the housing and the support structure, and configured to move the support structure with respect to the housing;

at least two detector assemblies, fixed to the support structure, and including respective radiation detectors and angular orientators; and a control unit, which is configured to perform a radioimaging procedure by:

driving the motor assembly to position the support structure in a plurality of positions with respect to the housing during a respective plurality of portions of the procedure, and while the support structure is positioned in each of the plurality of positions, driving the orientators to orient the respective detectors in a plurality of rotational orientations with respect to the ROI, and to detect radiation from the ROI at least a portion of the rotational orientations.

Typically, the housing and the support structure are configured such that, throughout the procedure, a furthest distance of all of the detectors from a center of the ROI throughout the procedure is less than 120% of a closest distance of all of the detectors from the center of the ROI.

For some applications, the at least two detector assemblies include at least five detector assemblies. For some applications, the control unit is configured to drive the motor assembly to position the support structure such that at least one of the detectors moves at least 30 mm during the procedure.

In an embodiment, the system includes exactly one motor assembly, which includes exactly one motor.

For some applications, the plurality of rotational orientations includes at least 30 rotational orientations, and the control unit is configured to drive the orientators to orient the respective detectors in the at least 30 rotational orientations while the support structure is positioned in each of the plurality of positions.

For some applications, the plurality of positions includes exactly two positions, and the control unit is configured to drive the motor to position the support structure in the two positions during two respective portions of the procedure. Alternatively or additionally, the plurality of positions includes exactly three positions, and the control unit is configured to drive the motor to position the support structure in the three positions during three respective portions of the procedure.

For some applications, the support structure is generally L-shaped. For some applications, the support structure is substantially rigid.

For some applications, the motor assembly includes a linear stepper motor; a first pivoting post, which is coupled to the support structure; and a second pivoting post, which is coupled to the housing.

For some applications, the motor assembly includes a position encoder configured to generate a position signal, and the control unit is configured to determine, responsively to the position signal, respective positions of the detectors with respect to the ROI. Typically, none of the detector assemblies includes a position sensor.

For some applications, the housing and support structure are configured such that, during the radioimaging procedure, the support structure moves generally around an axis which is perpendicular to a plane defined by the detectors and passes through the ROI.

For some applications, the housing is shaped so as to define a cavity therein, and the support structure is positioned within the cavity.

There is further provided, in accordance with an embodiment of the present invention, a method for radioimaging a region of interest (ROI) of a subject, the method including performing a radioimaging procedure by:

during a plurality of portions of the procedure, positioning a support structure in a respective plurality of positions with respect to a housing to which the support structure is movably coupled, which housing is fixed to at least two radiation detectors; and while the support structure is positioned in each of the plurality of positions, orienting the detectors in a plurality of rotational orientations with respect to the ROI, and, using the detectors, detecting radiation from the ROI at least a portion of the rotational orientations.

There is still further provided, in accordance with an embodiment of the present invention, an imaging system for imaging a region of interest (ROI) of a subject, the system including:

at least first and second angular orientators;

at least first and second translators;

at least first and second detectors, coupled to the first and second orientators, respectively, and to the first and second translators, respectively; and a control unit, which is configured to:

during a first portion of an image acquisition procedure, drive the first and second translators to position the first and second detectors in first and second lateral positions, respectively, and while the detectors are thus positioned, drive the first and second orientators to orient the first and second detectors, respectively, in a plurality of rotational orientations with respect to the ROI, and during a second portion of the image acquisition procedure, drive the first and second translators to position the first and second detectors in third and fourth lateral positions, respectively, and, while the detectors are thus positioned, drive the first and second orientators to orient the first and second detectors, respectively, in a plurality of rotational orientations with respect to the ROI.

In an embodiment, the first and second detectors have respective rotational axes, when the first and second detectors are positioned in the first and second lateral positions, respectively, the respective rotational axes of the first second detectors have an inter-detector distance, and when the first and second detectors are positioned in the third and fourth lateral positions, a distance between the rotational axis of the first detector when in the first and third positions is between 40% and 60% of the inter-detector distance.

For some applications, each of the detectors is coupled to its respective translator via its respective orientator.

There is further provided, in accordance with an embodiment of the present invention, an imaging system for imaging a region of interest (ROI) of a subject, the system including:

at least one detector assembly, which includes:

first and second angular orientators;

first and second axial supports, coupled to the first and second angular orientators, respectfully; and at least first and second detectors, coupled to the first and second axial supports, respectively, such that the first detector is completely longitudinally offset from the second detector; and a control unit, which is configured to:

during a first portion of an image acquisition procedure, position the detector assembly in a first longitudinal position with respect to the ROI, and, while the detector assembly is thus positioned, drive the first and second orientators to orient the first and second axial supports, respectively, in a plurality of rotational orientations with respect to the ROI, and during a second portion of the image acquisition procedure, position the detector assembly in a second longitudinal position with respect to the ROI, and, while the detector assembly is thus positioned, drive the first and second orientators to orient the first and second axial supports, respectively, in a plurality of rotational orientations with respect to the ROI.

In an embodiment, the first detector has a longitudinal length, and the control unit is configured to position the detector assembly in the first and second longitudinal positions such that a longitudinal distance between the first and second longitudinal positions equals between 0.8 and 1.2 times the longitudinal length of the first detector.

In an embodiment, the system includes at least one motor, and the control unit is configured to position the detector assembly by driving the at least one motor to move the detector assembly with respect to the ROI. Alternatively, the control unit is configured to position the detector assembly by driving the at least one motor to move the ROI with respect to the detector assembly.

Typically, the at least one detector assembly includes a plurality of detector assemblies.

For some applications, the detector assembly includes at least third and fourth detectors, coupled to the first and second axial supports, respectively, such that both the first and third detectors are completely longitudinally offset from both the second and fourth detectors, and the second detector is positioned longitudinally between the first and third detectors.

The present invention will be more fully understood from the following detailed description of embodiments thereof, taken together with the drawings, in which:

BRIEF DESCRIPTION OF THE DRAWINGS

FIGS. 3A-B are schematic illustrations of a detector assembly configured for translatory motion, in accordance with an embodiment of the present invention;

DETAILED DESCRIPTION OF EMBODIMENTS

Figure 1:
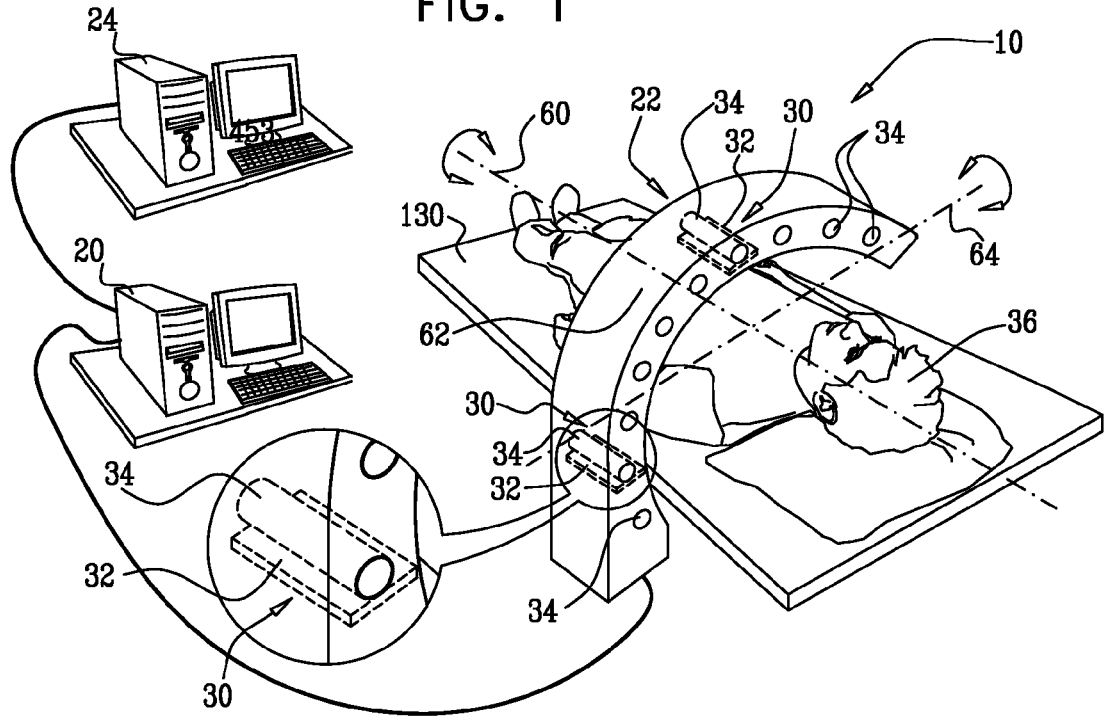
FIG. 1 is a schematic illustration of an imaging system, in accordance with an embodiment of the present invention.

FIG. 1 is a schematic illustration of an imaging system 10, in accordance with an embodiment of the present invention. Imaging system 10 comprises a control unit 20, a camera 22, and an imaging workstation 24. Typically, control unit 20 and imaging workstation 24 comprise one or more standard personal computers or servers with appropriate memory, communication interfaces and software for carrying out the functions prescribed by relevant embodiments of the present invention. This software may be downloaded to the control unit and imaging workstation in electronic form over a network, for example, or it may alternatively be supplied on tangible media, such as CD-ROM.

Control unit 20 typically comprises: (a) image acquisition functionality, which is configured to drive camera 22 to perform image acquisition of the patient; (b) image reconstruction functionality, which is configured to perform an image reconstruction procedure on the acquired image; (c) image analysis functionality, which is configured to perform an image analysis procedure on the reconstructed image; and (d) diagnosis functionality, which is configured to perform a diagnostic procedure using the results of the image analysis procedure. It will be appreciated that control unit 20 may comprise a plurality of personal computers or servers, each of which performs one or more of these procedures, and that one or more of these computers or servers may be located remotely from camera 22. Imaging workstation 24 displays the reconstructed images and allows the attending healthcare worker to view and manipulate the images.

For some applications, camera 22 utilizes techniques described in the above-mentioned PCT Publications WO 06/051531 and/or WO 05/119025, and/or in the other co-assigned patent applications and/or patent application publications incorporated herein by reference.

In an embodiment of the present invention, camera 22 comprises a plurality of detector assemblies 30, each of which comprises a detector 32 coupled to an angular orientator 34. Each of the detectors comprises a plurality of gamma ray sensors, such as a pixelated array of crystals, e.g., CZT crystals, and at least one collimator. For example, the array may comprise 16×64 pixels, arranged in sub-arrays of 16×16 pixels. Detector assemblies 30 are arranged at least partially around a region of interest (ROI) of subject 36.

Figure 2:
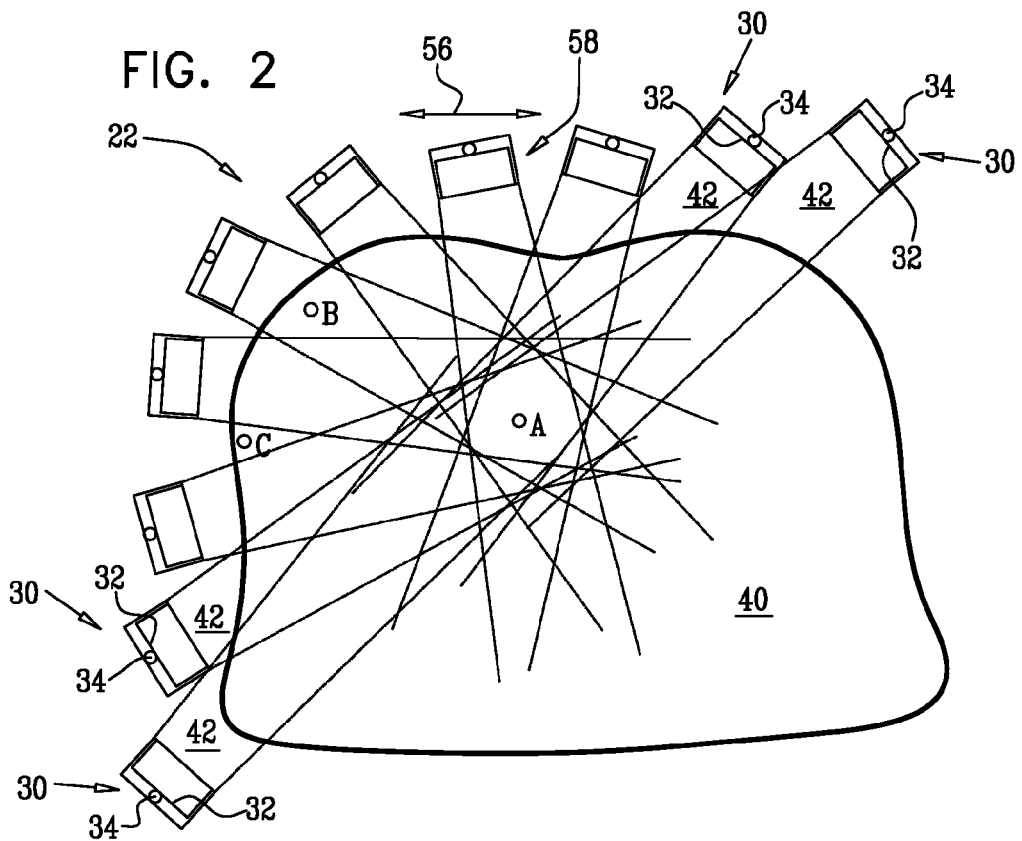
FIG. 2 is a schematic cross-sectional illustration of a portion of a camera of the imaging system of FIG. 1 placed partially around a region of interest of a subject, in accordance with an embodiment of the present invention.

Reference is made to FIG. 2, which is a schematic cross-sectional illustration of a portion of camera 22 placed partially around an ROI 40 of subject 36, in accordance with an embodiment of the present invention. During an image acquisition procedure, control unit 20 drives, typically separately, each of orientators 34 to orient its respective detector 32 in a plurality of rotational orientations with respect to ROI 40. Control unit 20 produces an image, typically, but not necessarily, a SPECT image, from a plurality of radiation acquisitions acquired with detectors 32 in different relative orientations.

For each of detectors 32, FIG. 2 shows a ray 42, which schematically represents the full angular range of photon detection of the detector, as determined by the angular orientations in which the detector's orientator 34 orients the detector, and the collimation of the detector. Each ray 42 schematically represents the combination of the plurality of distinct angular orientations at which the corresponding detector is oriented during an imaging procedure. For example, a detector may be oriented at 60 distinct angular orientations, each of which is separated by one degree, with a dwell time of one or two seconds at each orientation, such that the total angular range is 60 degrees, and the total scan time is 60 or 120 seconds, respectively. Alternatively, a detector may be oriented at fewer or greater than 60 distinct angular orientations, which are separated by less or more than one degree, with a dwell time of any number of seconds at each orientation. For some applications, camera 22 is configured to individually set a total angular range of each of detectors 32 responsively to the detector's orientation with respect to ROI 40. For example, techniques may be used that are described in an international patent application filed May 11, 2006, entitled, "Unified management of radiopharmaceutical dispensing, administration, and imaging," which is assigned to the assignee of the present application and is incorporated herein by reference. For some applications, the detector is oriented at each of the distinct angular orientations as the detector sweeps in a single direction. Alternatively, the detector is oriented at only a portion, e.g., half, of the distinct angular orientations as the detector sweeps in a first direction, and the detector is orientated at the remaining distinct angular orientations as the detector sweeps back in a second direction opposite the first direction.

In typical implementations of camera 22, detector assemblies 30 are laterally spaced apart from one another because of physical constraints, such as the width and depth of detectors 32. Such spacing causes reduced detection of photons emitted from certain areas of ROI 40, particularly areas near the surface of the subject's body, which are near the detectors. As can be seen in FIG. 2, gamma rays emitted from certain points within ROI 40, such as a centrally-located point A, may be detected by any of detectors 32, while gamma rays emitted from other points within ROI 40, such as a point B located near the periphery of ROI 40, may be detected by only a single detector 32 (ignoring potential scattering). Gamma rays emitted from still other points, such as a point C, cannot be detected by any of the detectors (again, ignoring potential scattering).

Reference is made to FIGS. 3A-B, which are schematic illustrations of detector assembly 30 configured for translatory motion, in accordance with an embodiment of the present invention. In this embodiment, each of detector assemblies 30 comprises a translator 50, which is configured to position detector 32 in a plurality of lateral positions. For example, translator 50 may comprise a track 52 and a support element 54 that slides along the track. Support element 54 typically comprises angular orientator 34. Other configurations for effecting translatory motion will be evident to those skilled in the art who have read the present application, and are within the scope of the present invention.

During an image acquisition procedure, control unit 20 drives each of translators 50 to position its respective detector 32 in a plurality of lateral positions, such as two lateral positions (e.g., as shown in FIGS. 3A and 3B, respectively). (An arrow 56 in FIG. 2 symbolically illustrates the approximate directions of lateral motion of a detector assembly 58.) While each detector 32 is in each of its respective lateral positions, control unit 20 drives the respective orientator 34 to orient the detector in a plurality of rotational orientations with respect to the ROI. The combination of such lateral translatory motion and rotational motion increases the number of angles from which photons emitted from the ROI are detected, particularly in areas of the ROI near the surface of the subject's body.

For some applications, control unit 20 drives each of translators 50 positions its respective detector in more than two lateral positions. For some applications, (a) the number of lateral positions of each detector and (b) the number of detectors (and corresponding number of detector assemblies) are selected such that the product of (a) and (b) equals a certain desired number of total lateral positions, e.g., between about 10 and about 30, such as between about 15 and about 25, e.g., about 18 positions. For example, if a total of 18 positions is desired, six detectors may be provided, in which case the number of lateral positions of each detector would be three. In current implementations, typically six or nine detectors are provided, with a corresponding number of positions per detector of three or two, respectively.

For some applications, during a first portion of an imaging procedure, each of the detectors is positioned in a first lateral position, and during a second portion of the imaging procedure, the detector is positioned in a second lateral position. The distance between the first and second positions is typically about 50% of the distance between the rotational axis of the detector and that of the neighboring detector, such as between about 40% and about 60% of the distance. The positioning of the detectors in both positions increases the number of angles from which photons emitted from the ROI are detected, thereby improving photon detection counts for areas of the ROI near the surface of the subject's body. For some imaging protocols, each of the detectors is positioned in the first and second lateral positions a plurality of times.

For some applications, fewer than all of detector assemblies 30 are configured for translatory motion. For example, one or more of the detector closer to the ROI (a "proximal detector" or an "inner detector") may be configured for translatory motion, while one or more of the detectors further from the ROI (a "distal detector" or an "outer detector") may be configured for only rotational motion.

For some applications, at least some of detectors 32 or detector assemblies 30 are configured to rotate around a horizontal axis, such as a horizontal axis 59 (assuming that orientators 34 rotate detectors 32 around a vertical axis). For some applications, control unit 22 rotates the detector assemblies around the their respective horizontal axes during an image acquisition procedure. For example, the control unit may perform a preliminary scan with the detectors at first respective rotations, and a subsequent higher-resolution scan with the detectors at second respective rotations. For some applications, the detector assemblies are fixed at differing rotational angles around their respective horizontal axes.

Reference is again made to FIG. 1. In an embodiment of the present invention, imaging system 10 effects lateral motion of detector assemblies 30 with respect to subject 36 by moving the entire camera 22, or a gantry thereof, with respect to the subject. For example, the system may rotate the camera, or a gantry thereof, e.g., about an axis 60 that passes through a curved region 62 of the camera and is generally parallel to the longitudinal axes of detector assemblies 30 (and with a longitudinal axis of subject 36 in a vicinity of the ROI). Alternatively, the system moves, e.g., rotates, subject 36 with respect to the camera, which remains stationary.

For some applications, imaging system 10 rotates camera 22, or a gantry thereof, around an axis 64 that is generally perpendicular to axis 60 and parallel with a plane defined by a subject support structure 130 in a vicinity of the ROI. Such rotation has an effect (at least for a portion of the detectors) similar to that of the individual rotation of detectors 32 or detector assemblies 30 around horizontal axis 59, as described hereinabove with reference to FIGS. 3A-B.

Reference is made to FIGS. 4A-C and 5A-B, which are schematic top-view illustrations of a configuration of camera 22, in accordance with respective embodiments of the present invention. In this embodiment, camera 22 comprises a support structure 200, to which detector assemblies 30 are coupled. In the embodiments shown in the figures, support structure 200 is generally L-shaped. Alternatively, the support structure has another shapes, such as an arc, e.g., of between about 60 and 360 degrees, such as about 90 to 180 degrees, e.g., between 60 and 120 degrees. For some applications, as shown in FIGS. 4A-C and 5A-B, support structure 200 is substantially rigid, while for other applications, the support structure comprises joints that impart flexibility to the support structure (configuration not shown). Camera 22 (typically an arm thereof) comprises a housing 210, which is shaped so as to define a cavity 212, in which support structure 200 is positioned. The housing generally is configured to remain stationary throughout an imaging procedure. In order to position each of the detector assemblies in a plurality of lateral positions, control unit 20 drives one or more motors to move support structure 200 within cavity 212. The one or more motors are described in detail hereinbelow with reference to FIG. 6. Cavity 212 is large enough to accommodate support structure 200 in its various orientations as it rotates through the cavity.

During an imaging procedure, support structure 200 moves generally around an axis which is perpendicular to a plane defined by the detectors and passes through the ROI (such as axis 60, shown in FIG. 1). Because of this motion generally around the axis, the distances of the detectors from the ROI do not generally vary substantially as the support structure moves. In other words, the housing and the support structure are configured such that a furthest distance of all of the detectors from a center of the ROI throughout an imaging procedure is less than 120% of a closest distance of all of the detectors from the center of the ROI throughout the procedure, e.g., less than 110%

Figure 4A:
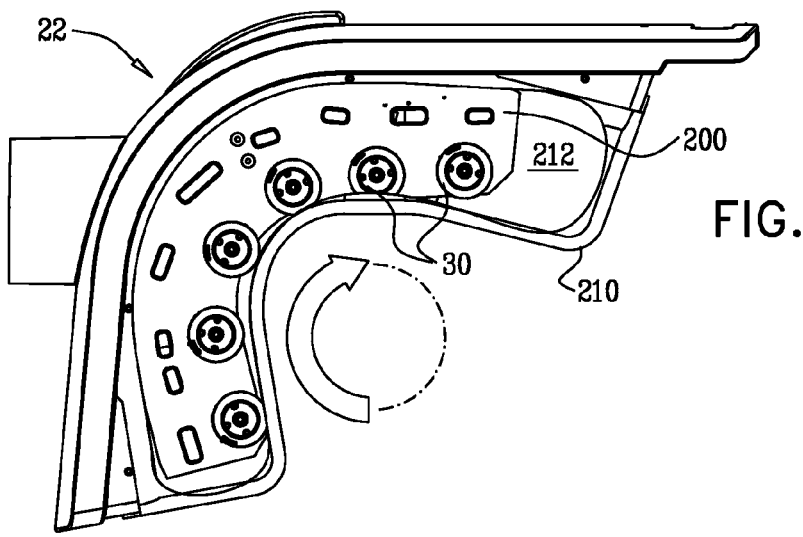
FIGS. 4A-C and 5A-B are schematic top-view illustrations of a configuration of a camera of the imaging system of FIG. 1, in accordance with respective embodiments of the present invention.
Figure 4B:
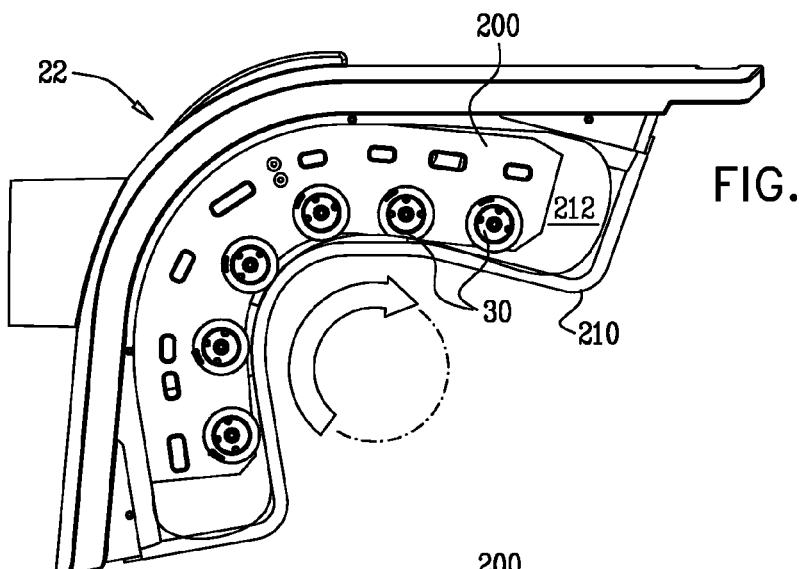
Figure 4C:
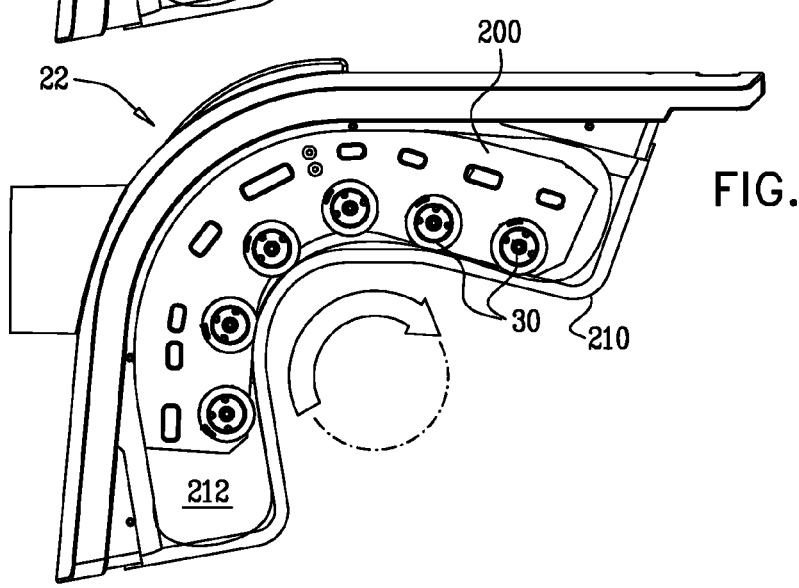

In the embodiment shown in FIGS. 4A-C, camera 22 comprises six detector assemblies 30, which the control unit positions in three respective lateral positions by moving support structure 200, shown in FIGS. 4A, 4B, and 4C, respectively. In the embodiment shown in FIGS. 5A-B, the camera comprises nine assemblies, which the control unit positions in two respective positions by moving support structure 200, shown in FIGS. 5A and 5B, respectively. As described hereinabove with reference to FIGS. 3A-B, the number of detector assemblies and positions are sometimes selected such that a product thereof equals a desired number of total lateral positions; in the examples shown in FIGS. 4A-C and 5A-B, the total number of lateral positions is 18. The positioning of the detectors in the plurality of positions increases the number of angles from which photons emitted from the ROI are detected, thereby improving photon detection counts for areas of the ROI near the surface of the subject's body. For some imaging protocols, each of the detectors is positioned in each of the plurality of positions a plurality of times.

For some applications, at a first point in time of an imaging procedure, a first detector assembly is positioned at a first initial detector assembly lateral position, and a second detector assembly neighboring the first detector assembly is positioned at a second initial detector assembly lateral position. The control unit moves the support structure such that, at one or more second points in time, the first detector assembly assumes one or more respective intermediate positions between the first initial detector assembly lateral position and the second initial detector assembly lateral position, typically not reaching the second initial detector assembly lateral position. For example, for applications in which the support structure is placed for imaging at exactly two support structure lateral positions during the imaging procedure, the control unit may move the support structure such that: (a) when the support structure is positioned at a first of the exactly two support structure lateral positions, the first detector assembly is positioned at the first initial detector assembly lateral position, and (b) when the support structure is positioned at a second of the exactly two support structure lateral positions, the first detector assembly is positioned at an intermediate location between 40% and 60% of the distance between the first and second initial detector assembly lateral positions, e.g., 50%. Similarly, for applications in which the support structure is placed for imaging at exactly three support structure lateral positions during the imaging procedure, the two intermediate positions are typically between 23% and 43%

(e.g., 33.3%), and 57% and 77% (e.g., 66.7%), respectively, of the distance between the first and second initial detector assembly lateral positions.

Figure 5A:
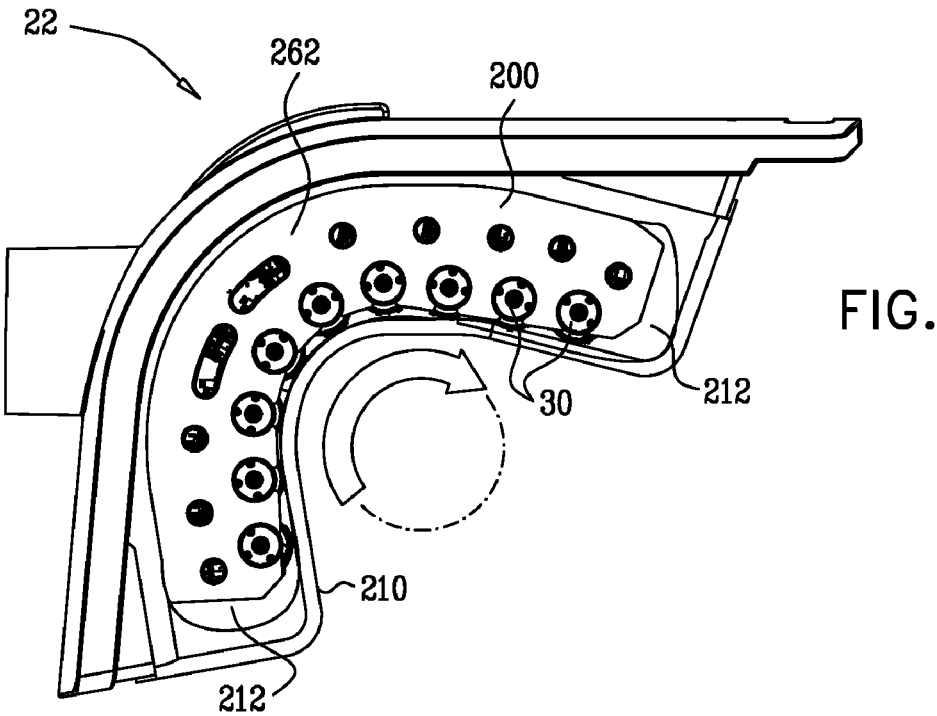
Figure 5B:
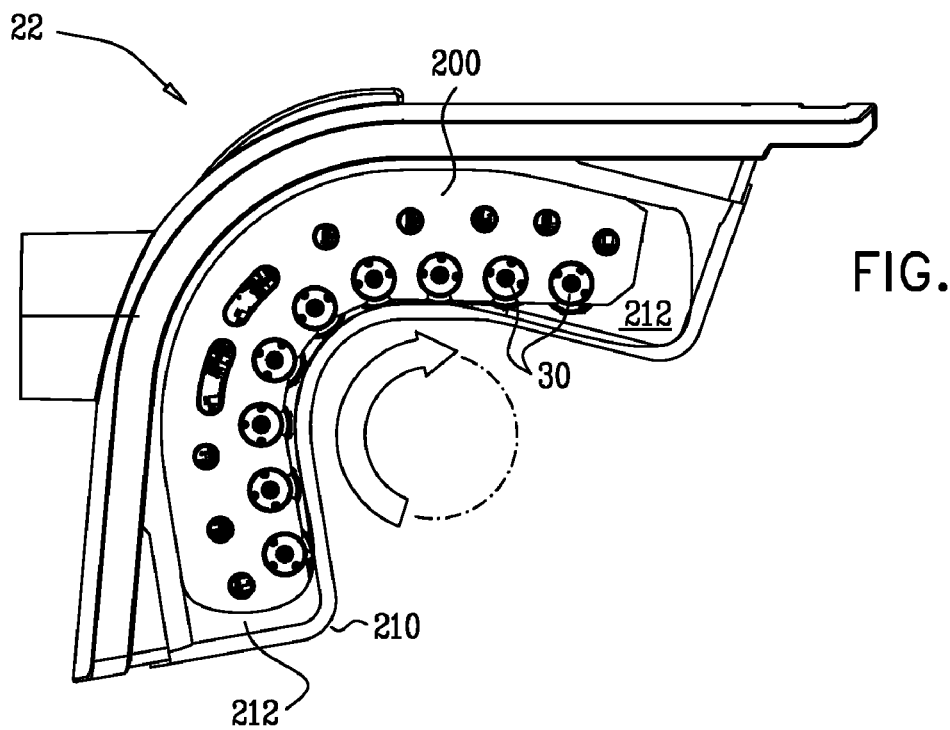
Figure 6:
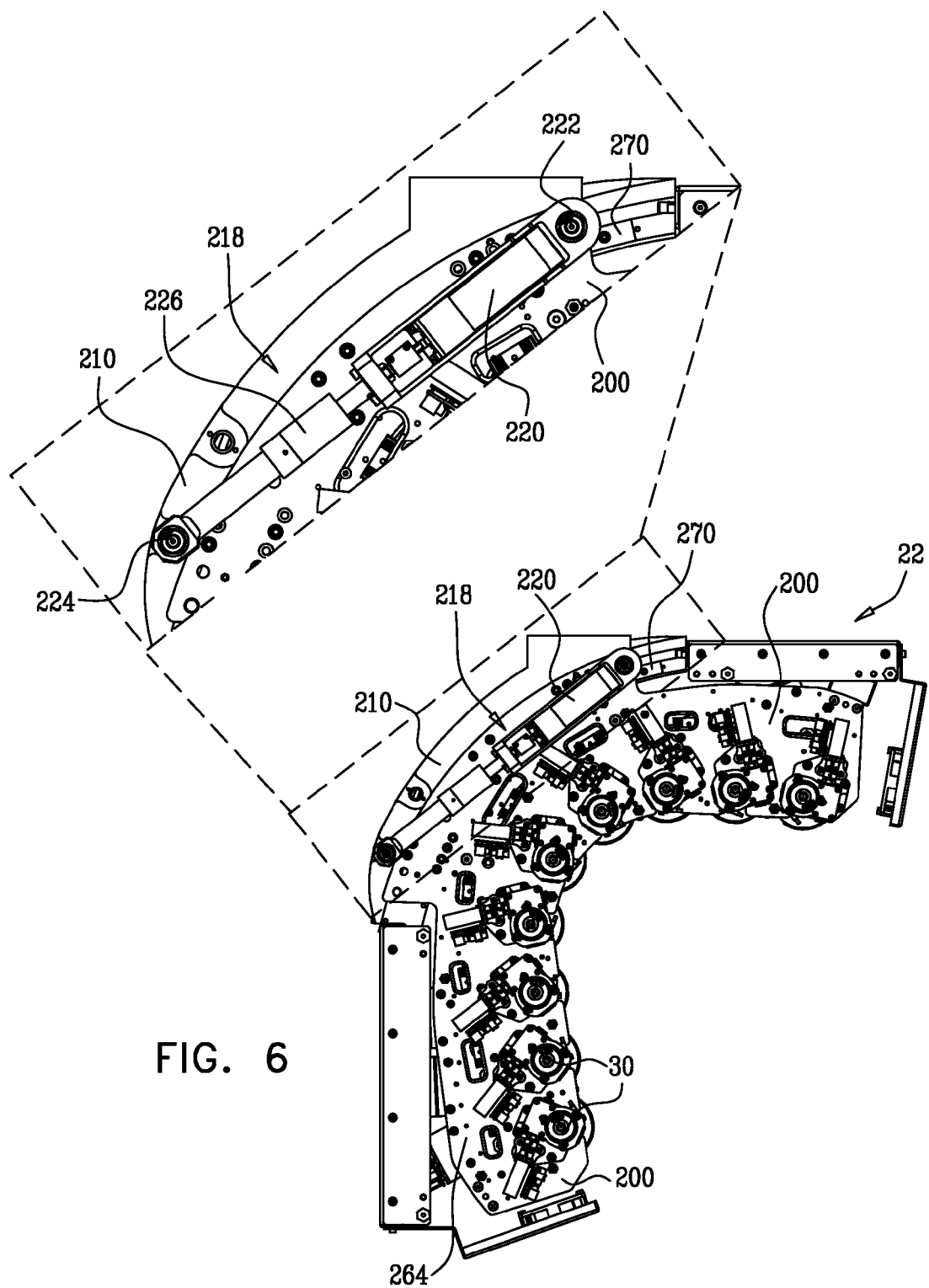
FIG. 6 is a schematic bottom-view illustration of the nine-detector configuration of the camera shown in FIGS. 5A-B, in accordance with an embodiment of the present invention.

Reference is made to FIG. 6, which is a schematic bottom-view illustration of the nine-detector configuration of camera 22 shown in FIGS. 5A-B, in accordance with an embodiment of the present invention. Camera 22 comprises at least one variable-length motor assembly 218 (typically exactly one variable-length motor assembly), which is configured to move support structure 200 with respect to housing 210 by changing a length of assembly 218. Motor assembly 218 comprises a motor 220, which typically comprises a linear stepper motor. For some applications, the motor comprises a DC motor with an integrated gear and linear position encoder. Motor assembly 218 typically further comprises a first pivoting post 222, which is coupled to support structure 200, and a second pivoting post 224, which is coupled to housing 210. For some applications, motor assembly further comprises a zero-backlash lead screw mechanism 226.

The linear position encoder measures the position of the motor, thereby enabling control unit 20 to determine the length of motor assembly 218 and the lateral position of support structure 200. Using this position information, the control unit determines the lateral positions of each detector assembly 30 and detector 32. Typically, a calibration procedure is performed during or after manufacture of camera 22 to determine the precise locations of each detector assembly 30 and detector 32 for each position value output by the linear position encoder.

Support structure 200, housing 210, and motor assembly 218 are typically configured to provide a total lateral range of motion of support structure 200 of between about 30 mm and about 60 mm, e.g., between about 40 mm and about 50 mm, with a radius of between about 20 mm and about 25 mm.

Reference is again made to FIGS. 5A and 6. For some applications, support structure 200 comprises an upper support frame 260, shown in FIG. 5A, and a lower support frame 262, shown in FIG. 6, which together support detector assemblies 30 from the top and bottom. For some applications, upper support frame 260 slides along an upper rail, and lower support frame 262 slides along lower rail, a portion 270 of which is shown in FIG. 6.

For some applications, the embodiments described with reference to FIGS. 4A-6 are practiced with techniques described herein with reference to FIGS. 1, 2, 3A-3B, and/or 7A-B, mutatis mutandis. For example, the lateral and angular motion patterns described hereinabove with reference to FIG. 2 are typically used.

The use of the single-support frame configuration of the embodiments described with reference to FIGS. 4A-6 enables the use of a single motor assembly for simultaneously positioning all of detector assemblies 30 at precise locations with respect to each other and a coordinate system of camera 22. The use of the linear position encoder enables precise determination of all of the detector assemblies, without requiring separate position sensors for each detector assembly.

Figure 7B:
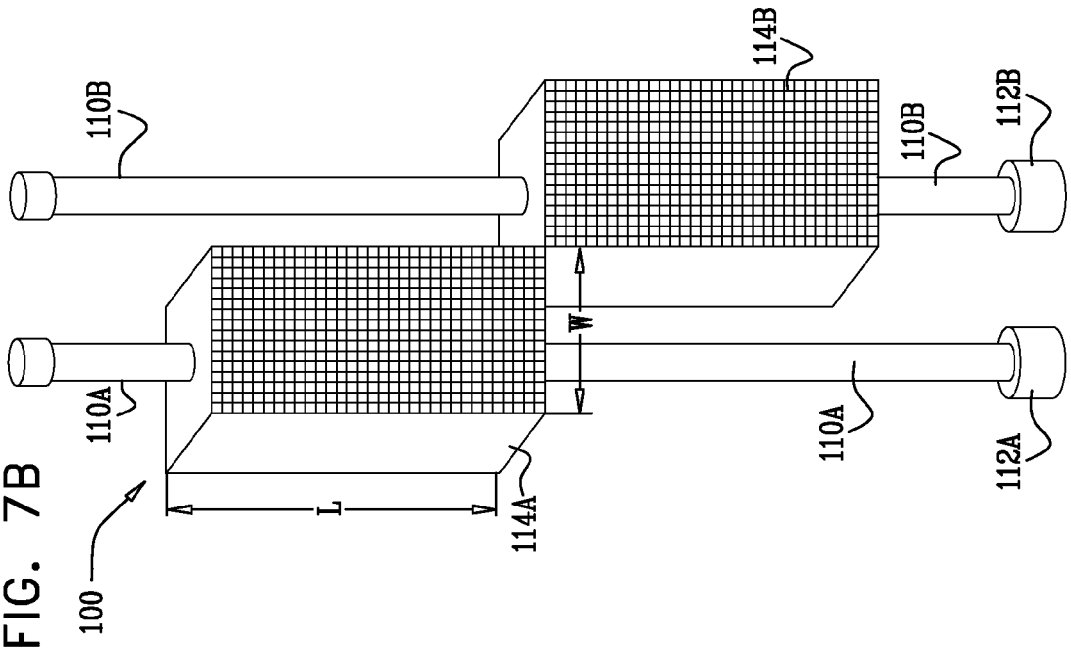
FIGS. 7A-B are schematic illustrations of another detector assembly, in accordance with respective embodiments of the present invention.
Figure 7A:
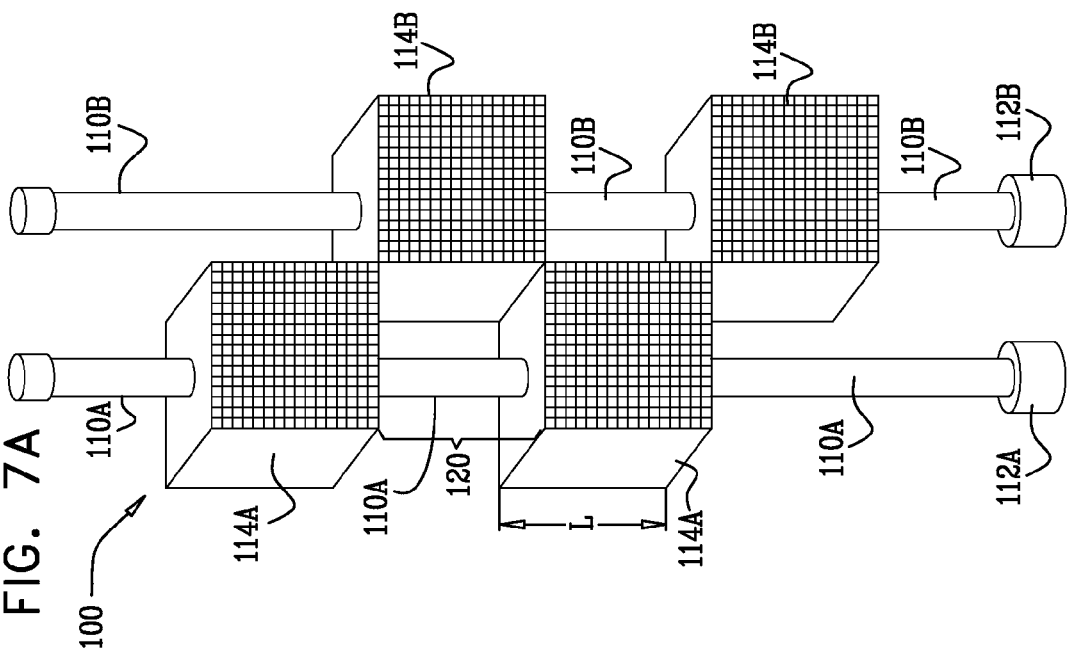

Reference is made to FIGS. 7A-B, which are schematic illustrations of a detector assembly 100, in accordance with respective embodiments of the present invention. Imaging system 10 comprises at least one detector assembly 100, which comprises two axial supports 110A and 110B, which are coupled to respective angular orientators 112A and 112B. The assembly further comprises one or more detectors 114A coupled to axial support 110A, and one or more detectors 114B coupled to axial support 110B. In the embodiment shown in FIG. 7A, assembly 100 comprises two detectors 114A and two detectors 114B, and in the embodiment shown in FIG. 7B, the assembly comprises a single detector 114A and a single detector 114B. Alternatively, the assembly comprises more than two detectors 114A and more than two detectors 114B.

Detectors 114A and 114B are arranged along axial supports 110A and 110B such that all of the one or more detectors 114A are completely longitudinally offset from all of the one or more detectors 114B. In other words, no portion of any detector 114A occupies the same longitudinal position as any portion of any detector 114B. For example, the detectors shown in FIG. 7A are arranged in a checkerboard pattern.

As a result of this offset arrangement, detectors 114A and 114B are able to positioned laterally closer to one another than is possible in the arrangements shown in FIGS. 1, 2, and 3A-B. However, assembly 100 has detection gaps in the longitudinal regions of each axial support to which no detector is coupled, such as region 120 of axial support 110A. To compensate for these gaps, camera 22 is configured to position detector assembly 100 in a first longitudinal position with respect to an ROI during a first portion of an image acquisition procedure, and in a second longitudinal position with respect to the ROI during a second portion of the procedure. A longitudinal distance between the first and second longitudinal positions typically equals approximately a longitudinal length L of one of the detectors, i.e., +/−20% of length L. While the assembly is in each of the longitudinal positions, control unit 20 drives orientators 110A and 110B to orient detectors 114A and 114B, respectively, in a plurality of rotational orientations with respect to the ROI. As a result, the entire ROI opposite assembly 100 is covered by the assembly in one of its two longitudinal positions with respect to the ROI.

For some applications, camera 22 is configured to longitudinally position the assemblies with respect to the ROI by moving the assemblies, either individually, or as a group by moving camera 22 (or a gantry thereof) to which the assemblies are coupled. For other applications, camera 22 is configured to longitudinally position the assemblies with respect to the ROI by moving the ROI, i.e., by moving the subject longitudinally. For example, the camera may move subject support structure 130, such as a bed upon which the subject is lying, or a chair upon which the subject is sitting (subject support structure 130 is shown in FIG. 1).

For some applications, when driving orientators 110A and 110B to orient detectors 114A and 114B, respectively, in a plurality of rotational orientations with respect to the ROI, control unit 20 drives one of the orientators to rotate its respective detector(s) in a first rotational direction, while driving the other of the orientators to rotate its respective detector(s) in a second rotational direction opposite the first direction. Alternatively, the control unit drives both of the orientators to rotate their respective detectors in the same rotational direction. In either case, the control unit typically drives the orientators to rotate their respective detectors in the remaining direction(s) after the assembly has been positioned in the other longitudinal position.

As described hereinabove with reference to FIGS. 3A-B regarding detector assemblies 30, for some applications, at least some of detectors 114 or detector assemblies 100 are configured to rotate around a horizontal axis (assuming that orientators 112 rotate detectors 114 around a vertical axis). For some applications, the control unit rotates the detector assemblies around the their respective horizontal axes during an image acquisition procedure. For example, the control unit may perform a preliminary scan with the detectors at first respective rotations, and a subsequent higher-resolution scan with the detectors at second respective rotations. For some applications, the detector assemblies are fixed at differing rotational angles around their respective horizontal axes.

For some applications in which each of the detectors comprises a plurality of gamma ray sensors, such as a pixelated array of crystals, e.g., CZT crystals, each of the detectors comprises a square array of pixels, e.g., a 16×16 array, as shown in FIG. 7A. For these applications, assembly 100 may comprise, for example, two detectors 114A and two detectors 114B. Alternatively, for some applications, each of the arrays comprises a rectangular array of pixels, for example, an array having a longitudinal length L that is equal to twice a width W of the array, e.g., a 32×16 array, as shown in FIG. 7B. Further alternatively, the ratio of the length L to the width W is greater than 2:1, such as 4.1, e.g., a 64×16 array (configuration not shown).

The scope of the present invention includes embodiments described in the following applications, which are assigned to the assignee of the present application and are incorporated herein by reference. In an embodiment, techniques and apparatus described in one or more of the following applications are combined with techniques and apparatus described herein:

an international patent application filed May 11, 2006, entitled, "Unified management of radiopharmaceutical dispensing, administration, and imaging";

International Patent Application PCT/IL2005/001173, filed Nov. 9, 2005, which published as PCT Publication WO 06/051531;

International Patent Application PCT/IL2005/000572, filed Jun. 1, 2005;

International Patent Application PCT/IL2005/000575, filed Jun. 1, 2005;

International Patent Application PCT/IL2005/001215, filed Nov. 16, 2005, which published as PCT Publication WO 06/054296;

U.S. Provisional Patent Application 60/625,971, filed Nov. 9, 2004;

U.S. Provisional Patent Application 60/628,105, filed Nov. 17, 2004;

U.S. Provisional Patent Application 60/630,561, filed Nov. 26, 2004;

U.S. Provisional Patent Application 60/632,236, filed Dec. 2, 2004;

U.S. Provisional Patent Application 60/632,515, filed Dec. 3, 2004;

U.S. Provisional Patent Application 60/635,630, filed Dec. 14, 2004;

U.S. Provisional Patent Application 60/636,088, filed Dec. 16, 2004;

U.S. Provisional Patent Application 60/640,215, filed Jan. 3, 2005;

U.S. Provisional Patent Application 60/648,385, filed Feb. 1, 2005;

U.S. Provisional Patent Application 60/648,690, filed Feb. 2, 2005;

U.S. Provisional Patent Application 60/675,892, filed Apr. 29, 2005;

U.S. Provisional Patent Application 60/691,780, filed Jun. 20, 2005;

U.S. Provisional Patent Application 60/700,318, filed Jul. 19, 2005;

U.S. Provisional Patent Application 60/700,299, filed Jul. 19, 2005;

U.S. Provisional Patent Application 60/700,317, filed Jul. 19, 2005;

U.S. Provisional Patent Application 60/700,753, filed Jul. 20, 2005;

U.S. Provisional Patent Application 60/700,752, filed Jul. 20, 2005;

U.S. Provisional Patent Application 60/702,979, filed Jul. 28, 2005;

U.S. Provisional Patent Application 60/720,034, filed Sep. 26, 2005;

U.S. Provisional Patent Application 60/720,652, filed Sep. 27, 2005;

U.S. Provisional Patent Application 60/720,541, filed Sep. 27, 2005;

U.S. Provisional Patent Application 60/750,287, filed Dec. 13, 2005;

U.S. Provisional Patent Application 60/750,334, filed Dec. 15, 2005;

U.S. Provisional Patent Application 60/750,597, filed Dec. 15, 2005;

U.S. Provisional Patent Application 60/799,688, filed May 11, 2006;

U.S. Provisional Patent Application 60/800,845, filed May 17, 2006, entitled, "Radioimaging camera for dynamic studies";

U.S. Provisional Patent Application 60/800,846, filed May 17, 2006, entitled, "Radioimaging protocols";

U.S. Provisional Patent Application 60/763,458, filed Jan. 31, 2006;

U.S. Provisional Patent Application 60/741,440, filed Dec. 2, 2005;

U.S. Provisional patent application Ser. No. 11/034,007, filed Jan. 13, 2005;

U.S. Provisional patent application Ser. No. 09/641,973, filed Aug. 21, 2000;

U.S. Provisional Patent Application 60/750,294, filed Dec. 13, 2005 (this application has not been assigned to the assignee of the present application; an assignment is in the process of being executed and filed);

U.S. Provisional Patent Application 60/816,970, filed Jun. 28, 2006;

International Patent Application PCT/IL2006/000059, filed Jan. 15, 2006;

International Patent Application PCT/IL2005/000048, filed Jan. 13, 2005;

International Patent Application PCT/IL03/00917, filed Nov. 4, 2003;

Israel Patent Application 172349, filed Nov. 27, 2005;

Israel Patent Application 171346, filed Oct. 10, 2005;

International Patent Application PCT/IL2006/000562, filed May 11, 2006;

International Patent Application PCT/IL2006/001511, filed Dec. 28, 2006;

International Patent Application PCT/IL2006/001291, filed Nov. 29, 2006;

International Patent Application PCT/IL2006/000834, filed Jul. 19, 2006;

International Patent Application PCT/IL2006/000840, filed Jul. 19, 2006;

U.S. Provisional Patent Application 60/754,199, filed Dec. 28, 2005;

U.S. patent application Ser. No. 11/607,075, filed Dec. 1, 2006;

U.S. patent application Ser. No. 11/656,548, filed Jan. 13, 2005;

U.S. patent application Ser. No. 10/533,568, filed Nov. 4, 2003; and/or

U.S. patent application Ser. No. 11/750,057, filed May 17, 2007.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. An imaging system for imaging a region of interest (ROI) of a subject, the system comprising:
    at least one orientator;
    at least one translator;
    at least one detector, coupled to the orientator and to the translator; and
    a control unit, which is configured to:
        during a first portion of an image acquisition procedure, drive the translator to position the detector in a first position, and, while the detector is thus positioned, drive the orientator to orient the detector in distinct angular orientations with respect to the ROI, by orienting the detector at only a portion of the distinct angular orientations during an initial sweep of the detector, and at remaining distinct angular orientations during a subsequent sweep of the detector, and
        during a second portion of the image acquisition procedure, drive the translator to position the detector in a second position, and, while the detector is thus positioned, drive the orientator to orient the detector in distinct angular orientations with respect to the ROI.

2. The system according to claim 1, wherein the portion of the distinct angular orientations is equal to half of the distinct angular orientations.

3. The system according to claim 1, wherein the detector is coupled to the translator via the orientator.

4. The system according to claim 1,
    wherein the at least one orientator includes at least first and second orientators,
    wherein the at least one detector includes at least first and second detectors, coupled to the first and second orientators, respectively, and to the at least one translator, and
    wherein the control unit is configured to:
        during the first portion of the image acquisition procedure, drive the at least one translator to position the first and second detectors in the first position and a third position, respectively, and while the first and second detectors are thus positioned, drive the first and second orientators to orient the first and second detectors, respectively, in the distinct angular orientations with respect to the ROI, by orienting the first and second detectors at only the portion of the distinct angular orientations during the initial sweep of the detectors, and at the remaining distinct angular orientations during the subsequent sweep of the detectors, and
        during the second portion of the image acquisition procedure, drive the at least one translator to position the first and second detectors in the second position and a fourth position, respectively, and, while the first and second detectors are thus positioned, drive the first and second orientators to orient the first and second detectors, respectively, in the distinct angular orientations with respect to the ROI.

5. The system according to claim 4, wherein the control unit is configured to, during the second portion of the image acquisition procedure, drive the first and second orientators to orient the first and second detectors, respectively, in the distinct angular orientations with respect to the ROI by orienting the first and second detectors at only part of the distinct angular orientations during an initial sweep of the first and second detectors, and at the remaining distinct angular orientations during a subsequent sweep of the detectors.

6. The system according to claim 1, wherein, during the first portion of the image acquisition procedure, the initial sweep of the detector is in a first direction, and the subsequent sweep of the detector is in a second direction opposite the first direction.

7. The system according to claim 6, wherein the portion of the distinct angular orientations is equal to half of the distinct angular orientations.

8. The system according to claim 1, wherein the control unit is configured to, during the second portion of the image acquisition procedure, drive the orientator to orient the detector in distinct angular orientations with respect to the ROI by orienting the detector at only part of the distinct angular orientations during an initial sweep of the detector, and at remaining distinct angular orientations during a subsequent sweep of the detector.

9. The system according to claim 8, wherein, during the second portion of the image acquisition procedure, the initial sweep of the detector is in a first direction, and the subsequent sweep of the detector is in a second direction opposite the first direction.

10. The system according to claim 8, wherein the part of the distinct angular orientations is equal to half of the distinct angular orientations.

11. The system according to claim 1, wherein the first and second positions are first and second lateral positions, respectively, and wherein the control unit is configured to drive the at least one translator to position the detector in the first and second lateral positions during the first and second portions of the image acquisition procedure, respectively.

12. The system according to claim 11, wherein the at least one translator comprises a track and a support element that slides along the track.

13. The system according to claim 11, wherein the at least one translator comprises a gantry, which the control unit is configured to move in order to effect lateral motion of the detector around the ROI.

14. The system according to claim 11, wherein the at least one translator comprises one or more motors and a support structure to which the at least one detector is coupled, and wherein the control unit is configured to drive the one or more motors to move the support structure in order to position the at least one detector in the first and second lateral positions.

15. The system according to claim 1, wherein the control unit is configured to begin the image acquisition procedure by performing a brief preliminary scan, and, based on the results of this preliminary scan, to determine one or more parameters of the image acquisition procedure.

16. The system according to claim 1, wherein the image acquisition procedure is a radiological image acquisition procedure, and wherein the at least one detector comprises at least one radiation detector.

17. The system according to claim 16, wherein the radiological image acquisition procedure is a SPECT image acquisition procedure.

18. The system according to claim 1,
    wherein the at least one orientator includes at least first and second orientators,
    wherein the at least one detector includes at least first and second detectors, coupled to the first and second orientators, respectively, and to the at least one translator, and
    wherein the control unit is configured to:

during the first portion of the image acquisition procedure, drive the at least one translator to position the first and second detectors in the first position and a third position, respectively, during the second portion of the image acquisition procedure, drive the at least one translator to position the first and second detectors in the second position and a fourth position, respectively.

19. The system according to claim 18,
wherein the first and second detectors have respective rotational axes,
wherein when the first and second detectors are positioned in the first and third positions, respectively, the respective rotational axes of the first and second detectors have an inter-detector distance, and
wherein a distance between the rotational axis of the first detector when positioned in the first position and the rotational axis of the first detector when positioned in the second position is between 40% and 60% of the inter-detector distance.

20. The system according to claim 18,
wherein the first and second detectors have respective rotational axes,
wherein when the first and second detectors are positioned in the first and third positions, respectively, the respective rotational axes of the first and second detectors have an inter-detector distance, and
wherein a distance between the rotational axis of the first detector when positioned in the first position and the rotational axis of the first detector when positioned in the second position is between 23% and 43% of the inter-detector distance.

21. The system according to claim 18, wherein the at least one translator includes at least first and second translators, wherein the at least first and second detectors are coupled to the at least first and second translators, respectively, and wherein the control unit is configured to:
during the first portion of the image acquisition procedure, drive the first and second translators to position the first and second detectors in the first and third positions, respectively, and
during the second portion of the image acquisition procedure, drive the first and second translators to position the first and second detectors in the second and fourth positions, respectively.

22. The system according to claim 18, wherein the first, second, third, and fourth positions are first, second, third, and fourth lateral positions, respectively, and wherein the control unit is configured to:
during the first portion of the image acquisition procedure, drive the at least one translator to position the first and second detectors in the first lateral position and the third lateral position, respectively, and
during the second portion of the image acquisition procedure, drive the at least one translator to position the first and second detectors in the second lateral position and the fourth lateral position, respectively.

23. The system according to claim 18, wherein the control unit is configured to individually set a total angular range of each of the first and second detectors responsively to the detector's orientation with respect to the ROI.

24. A method for imaging a region of interest (ROI) of a subject, the method comprising:
during a first portion of an image acquisition procedure, driving at least one translator to position at least one detector in a first position, and, while the detector is thus positioned, driving at least one orientator to orient the detector in distinct angular orientations with respect to the ROI, by orienting the detector at only a portion of the distinct angular orientations during an initial sweep of the detector, and at remaining distinct angular orientations during a subsequent sweep of the detector; and
during a second portion of the image acquisition procedure, driving the translator to position the detector in a second position, and, while the detector is thus positioned, driving the orientator to orient the detector in distinct angular orientations with respect to the ROI.

25. The method according to claim 24, wherein the portion of the distinct angular orientations is equal to half of the distinct angular orientations.

26. The method according to claim 24, wherein the detector is coupled to the translator via the orientator.

27. The method according to claim 24, wherein, during the first portion of the image acquisition procedure, the initial sweep of the detector is in a first direction, and the subsequent sweep of the detector is in a second direction opposite the first direction.

28. The method according to claim 27, wherein the portion of the distinct angular orientations is equal to half of the distinct angular orientations.

29. The method according to claim 24, wherein driving, during the second portion of the image acquisition procedure, the orientator to orient the detector in distinct angular orientations with respect to the ROI comprises driving the orientator to orient the detector at only part of the distinct angular orientations during an initial sweep of the detector, and at remaining distinct angular orientations during a subsequent sweep of the detector.

30. The method according to claim 29, wherein, during the second portion of the image acquisition procedure, the initial sweep of the detector is in a first direction, and the subsequent sweep of the detector is in a second direction opposite the first direction.

31. The method according to claim 29, wherein the part of the distinct angular orientations is equal to half of the distinct angular orientations.

32. The method according to claim 24,
wherein the at least one orientator includes at least first and second orientators,
wherein the at least one detector includes at least first and second detectors, coupled to the first and second orientators, respectively, and to the at least one translator, and
wherein driving the at least one translator comprises:
during the first portion of the image acquisition procedure, driving the at least one translator to position the first and second detectors in the first position and a third position, respectively, and while the detectors are thus positioned, driving the first and second orientators to orient the first and second detectors, respectively, in the distinct angular orientations with respect to the ROI, by orienting the detectors at only the portion of the distinct angular orientations during the initial sweep of the detectors, and at the remaining distinct angular orientations during the subsequent sweep of the detectors; and
during the second portion of the image acquisition procedure, driving the at least one translator to position the first and second detectors in the second position and a fourth position, respectively, and, while the detectors are thus positioned, driving the first and second orientators to orient the first and second detectors, respectively, in the distinct angular orientations with respect to the ROI.

33. The method according to claim 32, wherein driving, during the second portion of the image acquisition procedure, the first and second orientators to orient the first and second detectors, respectively, in the distinct angular orientations with respect to the ROI comprises driving the first and second orientators to orient the first and second detectors at only part of the distinct angular orientations during an initial sweep of the first and second detectors, and at the remaining distinct angular orientations during a subsequent sweep of the first and second detectors.

34. The method according to claim 24,
wherein the at least one orientator includes at least first and second orientators,
wherein the at least one detector includes at least first and second detectors, coupled to the first and second orientators, respectively, and to the at least one translator, and
wherein driving the at least one translator comprises:
during the first portion of the image acquisition procedure, driving the at least one translator to position the first and second detectors in the first position and a third position, respectively; and
during the second portion of the image acquisition procedure, driving the at least one translator to position the first and second detectors in the second position and a fourth position, respectively.

35. The method according to claim 34,
wherein the first and second detectors have respective rotational axes,
wherein when the first and second detectors are positioned in the first and third positions, respectively, the respective rotational axes of the first and second detectors have an inter-detector distance, and
wherein driving the at least one translator comprises driving the at least one translator to position the first detector such that a distance between the rotational axis of the first detector when positioned in the first position and the rotational axis of the first detector when positioned in the second position is between 40% and 60% of the inter-detector distance.

36. The method according to claim 34,
wherein the first and second detectors have respective rotational axes,
wherein when the first and second detectors are positioned in the first and third positions, respectively, the respective rotational axes of the first and second detectors have an inter-detector distance, and
wherein driving the at least one translator comprises driving the at least one translator to position the first detector such that a distance between the rotational axis of the first detector when positioned in the first position and the rotational axis of the first detector when positioned in the second position is between 23% and 43% of the inter-detector distance.

37. The method according to claim 34,
wherein the at least one translator includes at least first and second translators,
wherein the at least first and second detectors are coupled to the at least first and second translators, respectively,
wherein, during the first portion of the image acquisition procedure, driving the at least one translator comprises driving the first and second translators to position the first and second detectors in the first and third positions, respectively, and
wherein, during the second portion of the image acquisition procedure, driving the at least one translator comprises driving the first and second translators to position the first and second detectors in the second and fourth positions, respectively.

38. The method according to claim 34, wherein the first, second, third, and fourth positions are first, second, third, and fourth lateral positions, respectively, and wherein driving the first and second translators comprises:
during the first portion of the image acquisition procedure, driving the at least one translator to position the first and second detectors in the first lateral position and the third lateral position, respectively; and
during the second portion of the image acquisition procedure, driving the at least one translator to position the first and second detectors in the second lateral position and the fourth lateral position, respectively.

39. The method according to claim 34, wherein driving the at least one orientator comprises individually setting a total angular range of each of the first and second detectors responsively to the detector's orientation with respect to the ROI.

40. The method according to claim 24, wherein the first and second positions are first and second lateral positions, respectively, and wherein driving the at least one translator comprises driving the at least one translator to position the detector in the first and second lateral positions during the first and second portions of the image acquisition procedure, respectively.

41. The method according to claim 40, wherein the at least one translator includes a track and a support element that slides along the track.

42. The method according to claim 40, wherein the at least one translator includes a gantry, and wherein driving the translator comprises moving the gantry in order to effect lateral motion of the detector around the ROI.

43. The method according to claim 40, wherein the at least one translator includes one or more motors and a support structure to which the at least one detector is coupled, and wherein driving the translator comprises driving the one or more motors to move the support structure in order to position the at least one detector in the first and second lateral positions.

44. The method according to claim 24, further comprising beginning the image acquisition procedure by performing a brief preliminary scan, and, based on the results of this preliminary scan, determining one or more parameters of the image acquisition procedure.

45. The method according to claim 24, wherein the image acquisition procedure is a radiological image acquisition procedure, and wherein the method comprises performing the radiological image acquisition procedure.

46. The method according to claim 45, wherein performing the radiological image acquisition procedure comprises performing a SPECT image acquisition procedure.

\* \* \* \* \*